(12) United States Patent
Lunghi

(10) Patent No.: US 6,598,731 B2
(45) Date of Patent: Jul. 29, 2003

(54) FEED MECHANISM FOR A CONVEYOR BELT

(75) Inventor: Don Lunghi, Hillsborough, CA (US)

(73) Assignee: Eldetco, Inc., San Mateo, CA (US)

( * ) Notice: Subject to any disclaimer, the term of this patent is extended or adjusted under 35 U.S.C. 154(b) by 0 days.

(21) Appl. No.: 09/932,785

(22) Filed: Aug. 17, 2001

(65) Prior Publication Data

US 2003/0034236 A1 Feb. 20, 2003

(51) Int. Cl.[7] ............................................. B65G 15/14
(52) U.S. Cl. ................................. 198/626.6; 198/725
(58) Field of Search ................................. 198/411, 415, 198/622, 626.6, 725

(56) References Cited

U.S. PATENT DOCUMENTS

| | | | |
|---|---|---|---|
| 163,077 A | * 5/1875 | Jackson | ...................... 198/622 |
| 1,108,163 A | 8/1914 | Frick | |
| 1,232,422 A | 7/1917 | Halvorsen | |
| 2,133,727 A | 10/1938 | Staude | |
| 3,703,231 A | 11/1972 | Montomery, Jr. | ........... 198/165 |
| 4,060,167 A | * 11/1977 | Smith | .......................... 198/622 |
| 4,502,586 A | * 3/1985 | Dusel et al. | .............. 198/626.6 |
| 5,358,092 A | * 10/1994 | Cinotti | ........................ 198/415 |
| 6,296,107 B1 | * 10/2001 | Baumgartner-Pichelsberger | ........... 198/626.6 |

* cited by examiner

Primary Examiner—Joseph E. Valenza
(74) Attorney, Agent, or Firm—Dergosits & Noah LLP

(57) ABSTRACT

A feeder conveyor belt system applies force to the upper surface of objects and assists in moving the objects over a planar surface. The feeder conveyor belt is mounted on a suspension system which allows the feeder conveyor belt to adjust to the contour of objects being transported.

20 Claims, 9 Drawing Sheets

FEED MECHANISM FOR A CONVEYOR BELT

FIELD OF INVENTION

The present invention describes a feed mechanism used with a conveyor belt system to transport objects.

BACKGROUND OF THE INVENTION

A wide variety of powered conveyor systems have been developed for transporting objects. Referring to FIG. 1, conveyor systems typically include a conveyor belt 101, pulleys 103 and a drive mechanism 105. The conveyor belt 101 is mounted tautly around pulleys 103 and a drive mechanism 105 rotates at least one of the pulleys 103 causing the conveyor belt 101 to move. Objects 107 placed on the conveyor belt 101 are transported from one end to the other.

In some applications additional force is required to move an object off of the end of a conveyor belt. For example, food products are often transported from a conveyor belt into a processing machine such as a slicing machine which requires additional force. Various methods have been developed for assisting in transporting objects off then end of a conveyor belt. In the food processing industry, mechanical metal claws have been attached to a food product and used to mechanically drive the product through the slicing machine. Problem with this system include: wasted material and inefficiency. More specifically, the part of the food product that is attached to the metal claw cannot be sliced without damaging the blades of the slicing machine and must be discarded. The food products transported to the slicing machine, must be attached to the claw typically by a worker which is time consuming and less efficient than an automated processing system.

Another method of assisting in transporting objects over a conveyor belt is the use of secondary conveyor belts which contact the top of objects being transported. U.S. Pat. No. 3,703,231 describes a conveyor system having several feeder conveyor belts mounted in parallel over a single lower conveyor belt. The feeder conveyor belt system of U.S. Pat. No. 3,703,231 is illustrated in FIG. 2. Object 207 travels on the lower conveyor belt assembly 211 which comprises: a feeder conveyor belt 203, an upper pulley 205 and a lower pulley 209. The feeder conveyor belt 203 rotates about the upper pulley 205 and the lower pulley 209 and the feeder conveyor belt assembly 211 rotates about the upper pulley 205. The rotational force of feeder conveyor belt 203 is applied to the object 207 and the vertical movement of the feeder conveyor belt assembly 211 conforms to the shape of the object 207.

Referring to FIG. 3, a drawback of the feeder conveyor belt of U.S. Pat. No. 3,703,231 is that a large object 205 that contacts the feeder conveyor belt 203 may lift the feeder conveyor belt 203 causing it to loose contact with a smaller object 207. What is needed in an improved feeder conveyor system capable of applying force to individual objects in close proximity.

SUMMARY OF THE INVENTION

The present invention is a feeder conveyor belt system which assists in propelling objects traveling on a lower conveyor belt. The feeder conveyor belts rotates about pulleys mounted on a movable linkage system. The linkage system allows the feeder conveyor belt to adjust to the contour of objects of various shapes. Objects traveling on the lower conveyor belt contact the feeder conveyor belt which applies a driving force to the top of the object. The suspension system allows vertical movement such that the feeder conveyor belt can apply a driving force to closely spaced objects.

BRIEF DESCRIPTION OF THE DRAWINGS

The invention is herein described, by way of example only, with reference to embodiments of the present invention illustrated in the accompanying drawings, wherein.

DETAILED DESCRIPTION

The present invention is a feeder conveyor belt system which adjusts to the contour of objects traveling under the feeder conveyor belts so that force can be applied to the upper surface of variably shaped objects.

Figure 1:
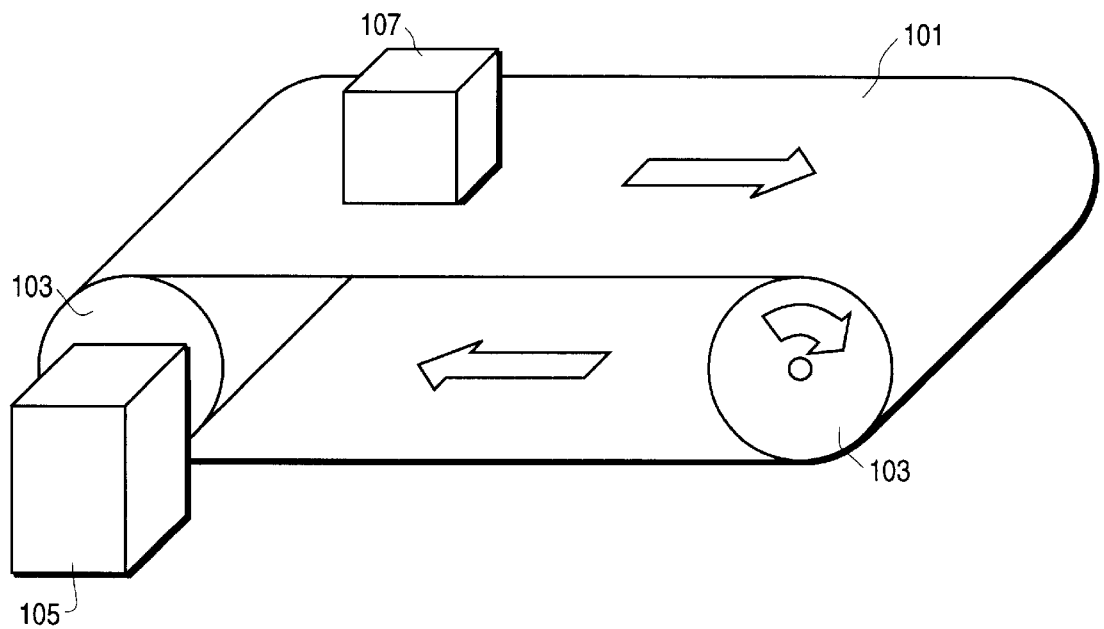
FIG. 1 illustrates a simple conveyor system (prior art)
Figure 2:
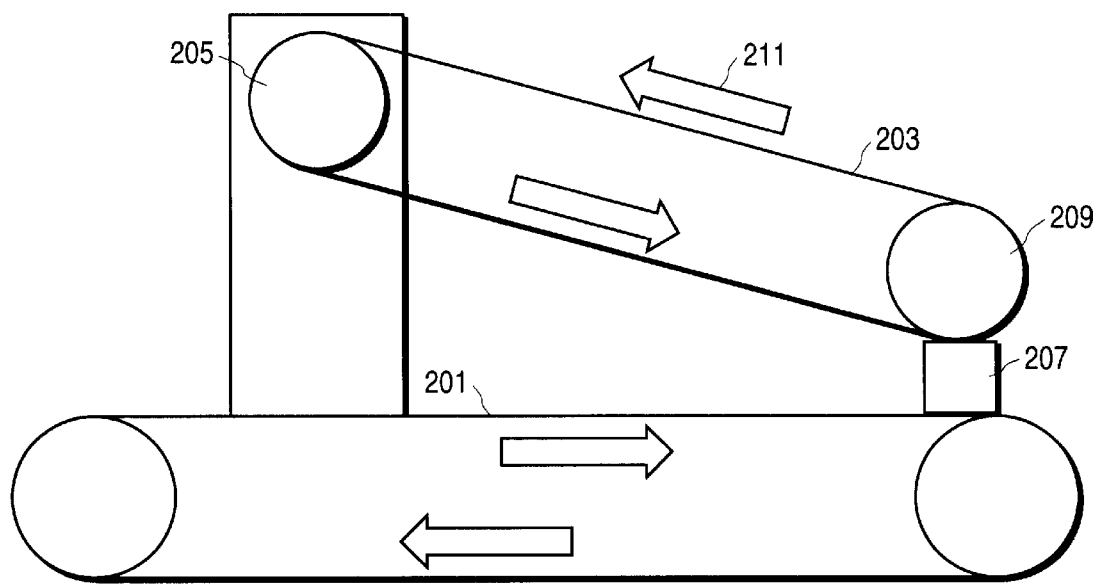
FIG. 2 illustrates the linkage mechanism of the feeder conveyor belt prior art)
Figure 3:
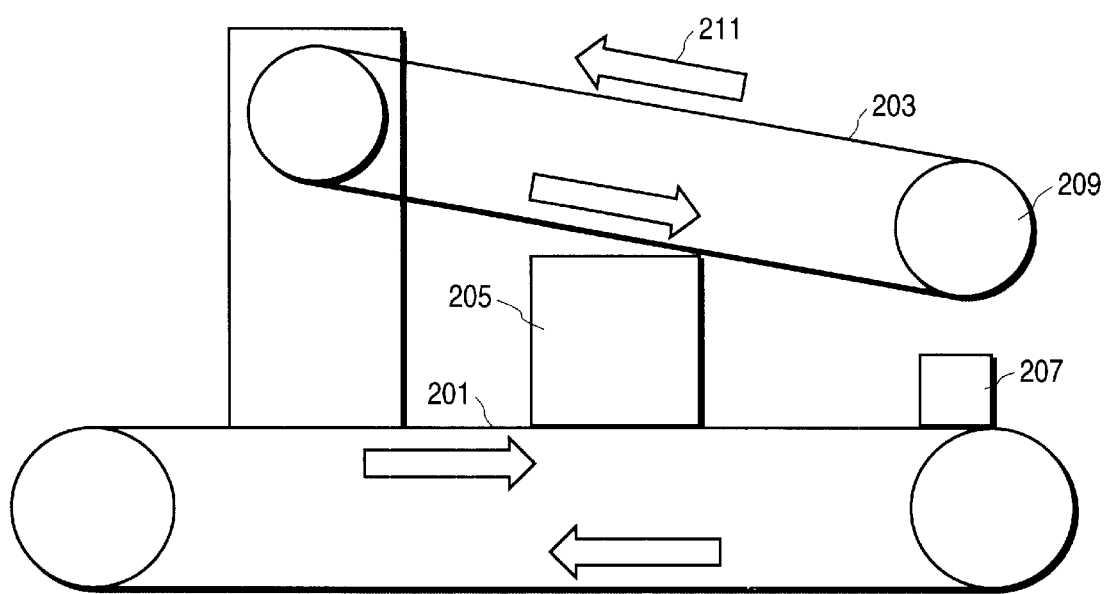
FIG. 3 illustrates the linkage mechanism of the feeder conveyor belt in full travel position (prior art)
Figure 4:
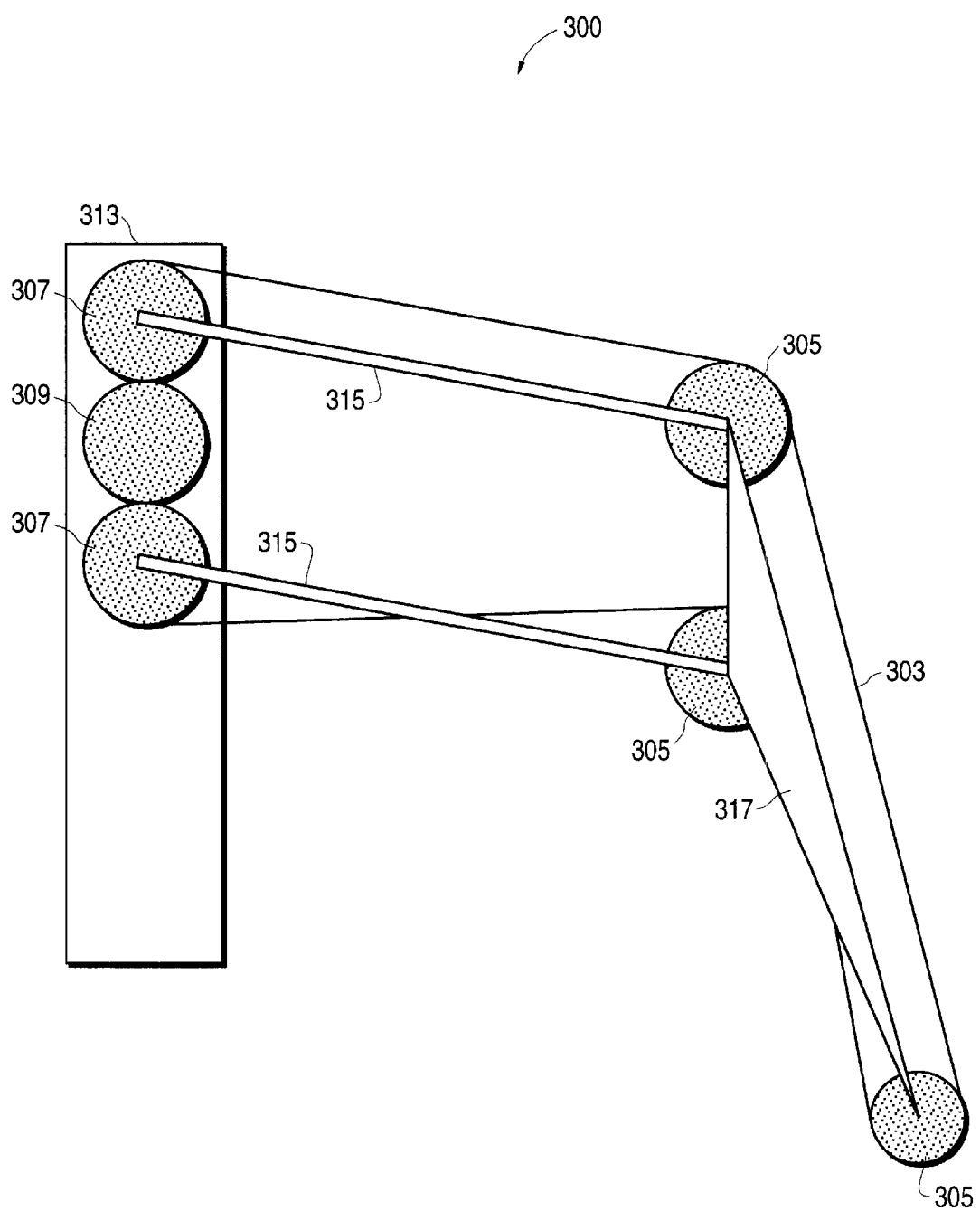
FIG. 4 illustrates the feeder conveyor belt in the lower position.
Figure 5:
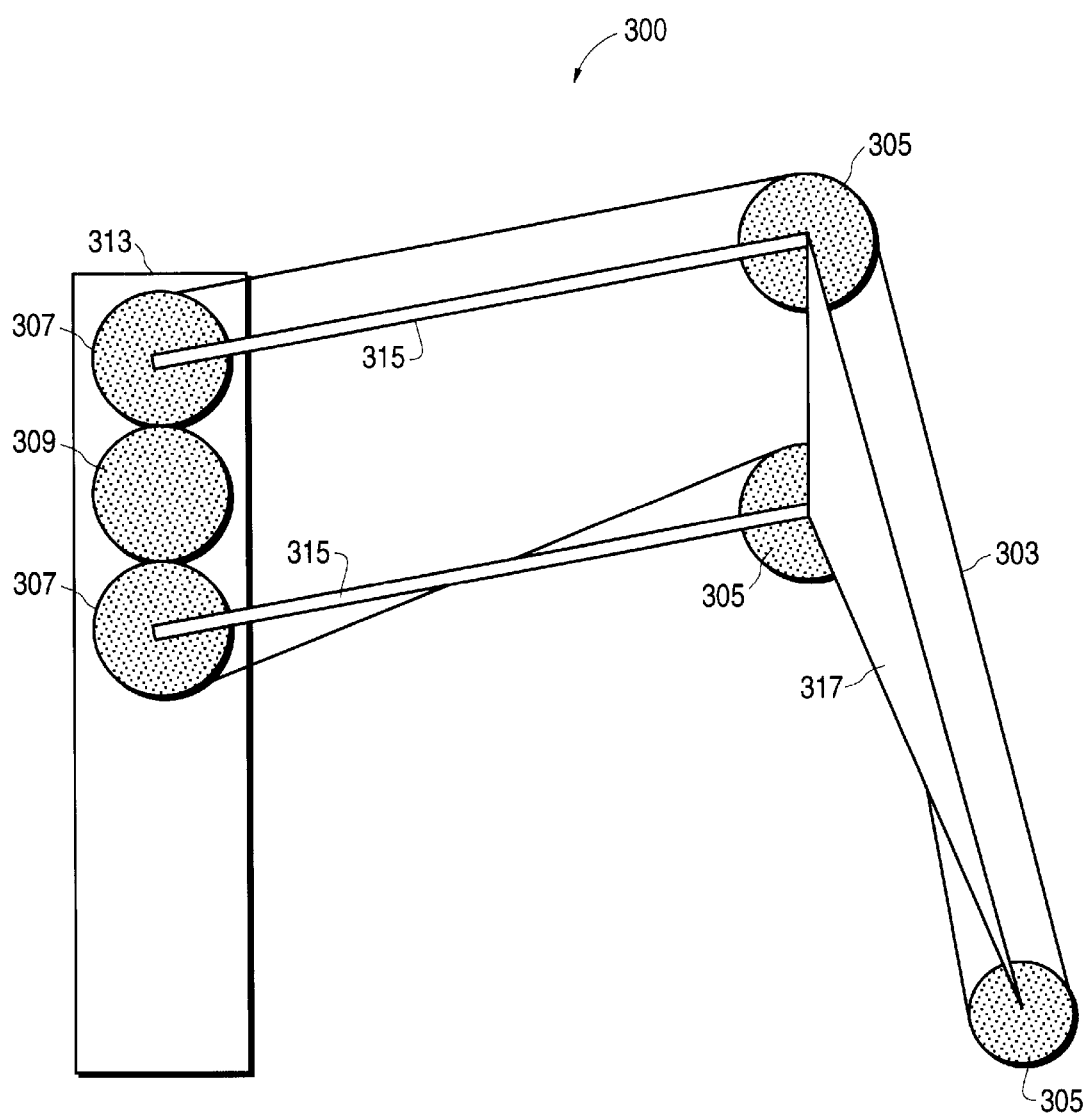
FIG. 5 illustrates the feeder conveyor belt in the upper position.

Referring to FIG. 4, an embodiment of the inventive feeder conveyor belt system 300 is illustrated. The feeder conveyor belt system 300 includes suspension pulleys 305, stationary pulleys 307, a drive pulley 309, a subframe 317, a drive frame 313, linkage arms 315 and a feeder conveyor belt 303. The drive pulley 309 transfers power to the feeder conveyor belt 303 and is mounted between two stationary pulleys. The stationary pulleys 307 direct the conveyor belt 303 around a large portion of the drive pulley 309 diameter for efficient power transfer. A rotational force may be applied to the drive pulley 309 by any suitable means including a motor, gear mechanism, belt system, chain system, pulley system, crank or any other known force transmission mechanism, as well as combinations of these various known techniques.

The suspension pulleys 305 are mounted on the subframe 317. Linkage arms 315 are rotatably coupled to the drive frame 313 and the subframe 317. The drive frame 313 is stationary and the linkage arms 315 allow the subframe 317 to move vertically. The feeder conveyor belt 303 rotates about the suspension pulleys 305 on the subframe 317 and can therefore also move vertically.

Figure 6:
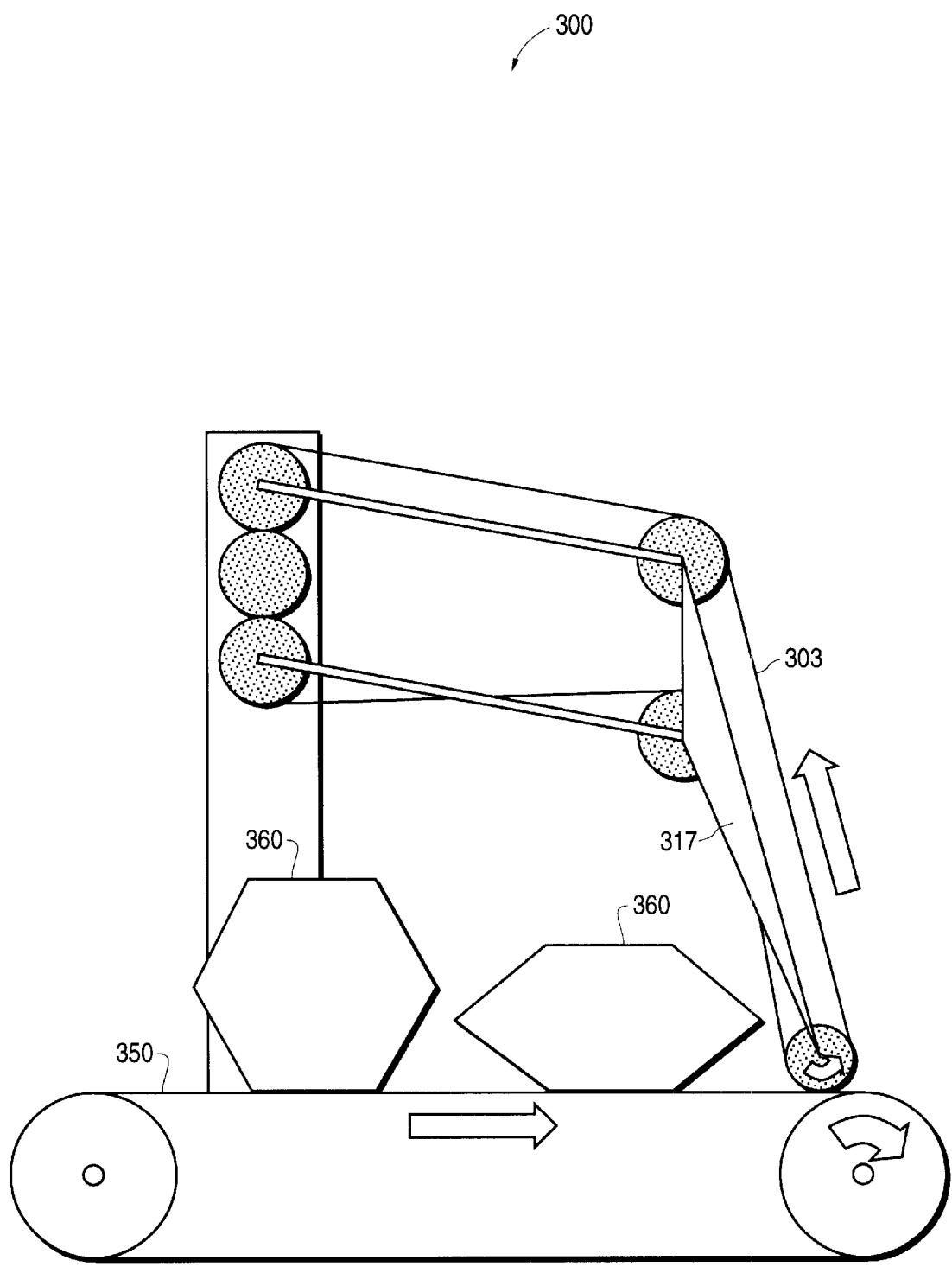
FIG. 6 illustrates objects on the conveyor belt prior to contacting the feeder conveyor belt.

FIG. 6 illustrates an embodiment of the inventive feeder conveyor belt system combined with a lower conveyor belt system 350. The subframe 317 is in a lowered position and the feeder conveyor belt 303 is not in contact with an object 360 on the lower conveyor belt 350. The inventive feeder conveyor belt system 300 directs the feeder conveyor belt 303 at a sharp angle to the lower conveyor belt 350. The sharp angle of the feeder conveyor belt 303 allows power to be individually applied to closely spaced adjacent objects 360. A downward force can be applied to subframe 317 to improve traction between the object 360 and the feeder conveyor belt 350. The downward force may be applied to the subframe 317 by gravity, a spring mechanism or any other suitable device. A stop mechanism may be part of the feeder conveyor belt system which prevents the feeder conveyor belt 350 from contacting the lower conveyor belt 350 regardless of the downward force applied to subframe 317.

In the preferred embodiment, the feeder conveyor belt system is used to transport food products into a processing equipment. As discussed, food processing equipment may include a slicing machine which can exert rotational, torsional and direct forces upon the food products. By applying the downward force of the feeder conveyor belt system, the food product is gripped by the conveyor belt system with sufficient force to overcome these processing machine forces.

Figure 7:
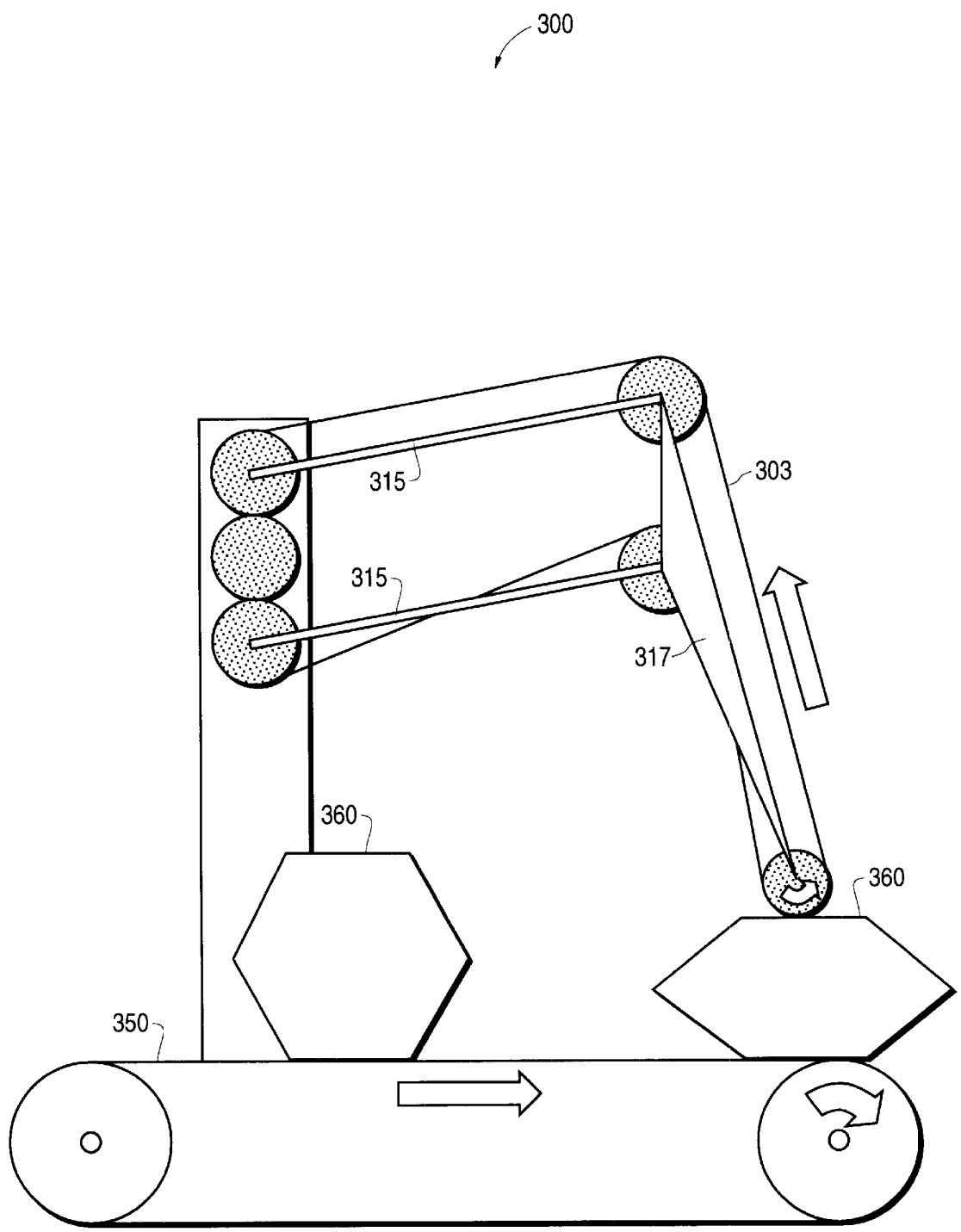
FIG. 7 illustrates objects on the conveyor belt during contact with the feeder conveyor belt.

FIG. 7 illustrates an embodiment of the feeder conveyor belt mechanism 300 in which the feeder conveyor belt 303 is in contact with objects 360 on the lower conveyor belt 350 and subframe 317 in an elevated position. When object 360 contacts the feeder conveyor belt 303, the subframe 317 and the feeder conveyor belt 303 adjusts to the contour of the upper surface of the objects 360. Rotation of the linkage arms 315 allow the subframe 317 and feeder conveyor belt 303 to travel vertically. Because the suspension pulleys 305 are mounted substantially at the linkage arm 315 junctions, the feeder conveyor belt 303 does not vary in length as the subframe 317 moves.

In an embodiment, the feeder conveyor belt 303 has an external surface having ribs across its width and a smooth inner surface. The drive pulley 309 has a splined surface with engages the ribs of the feeder conveyor belt 303 and provides positive traction to drive the feeder conveyor belt 303 around the stationary pulleys 307 and the suspension pulleys 305. In another embodiment the drive pulley 309 and feeder conveyor belt 303 may have different types of surfaces which provide efficient force transmission.

The inventive feeder conveyor belt system is particularly useful for feeding solid food products into slicing machines. As discussed, mechanical devices such as claws are attached to one end of the food product and used to push the food products into slicing machines. Because these mechanical devices will damage the slicing blades, the portion of the food product which is attached to the mechanical device can not be sliced and may be wastefully discarded. Because the inventive feeder conveyor belt system does not require attaching a mechanical pushing device almost all of the food product can be processed. Another benefit is that food processing equipment is continuously operating and does not have down time while a mechanical pushing device is attached to the food product, resulting in increased revenues.

Figure 8:
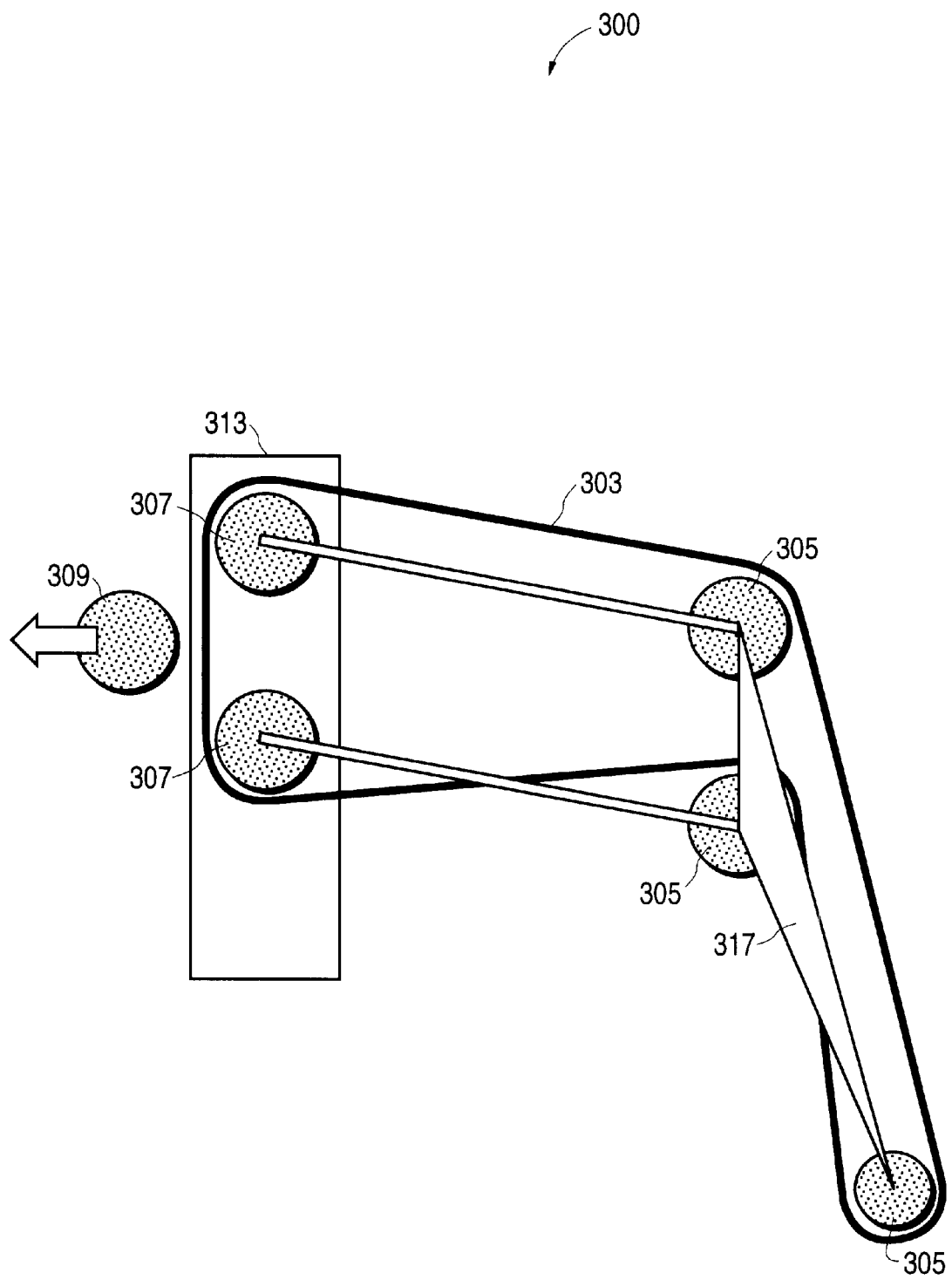
FIG. 8 illustrates the conveyor belt loosened from the feeder conveyor belt.

Referring to FIG. 8, in an embodiment, the drive assembly is configured so that drive pulley 309 can be easily removed from the feeder conveyor belt system 300. When the drive pulley 309 is removed from the drive frame 313, the feed conveyor belt 303 is relaxed which allows the stationary pulleys 307 and suspension pulleys 305 to be removed from the feeder conveyor belt system 300. Disassembly of the feeder conveyor belt system 300 is necessary for cleaning or repair.

Referring again to FIG. 8, in an embodiment a releasable fastener holds the drive pulley 309 to the drive frame 313. The releasable fastener can be: shackles, buckles, screws, snaps, clamps or any other suitable releasable fastener mechanisms as well as combinations of these various known devices. In an embodiment the releasable fastener mechanism includes two buckles which are mounted on either side of the feeder conveyor belt 303 which are operated by hand and do not require tools to fasten or release. In an alternative embodiment, the releasable fastener mechanism may include a tab and slot on one side of the feeder conveyor belt 303 and a single buckle on the opposite side of the feeder conveyor belt 303. The quick release mechanism allows the feeder conveyor belt system to be easily assembled and disassembled.

Figure 9:
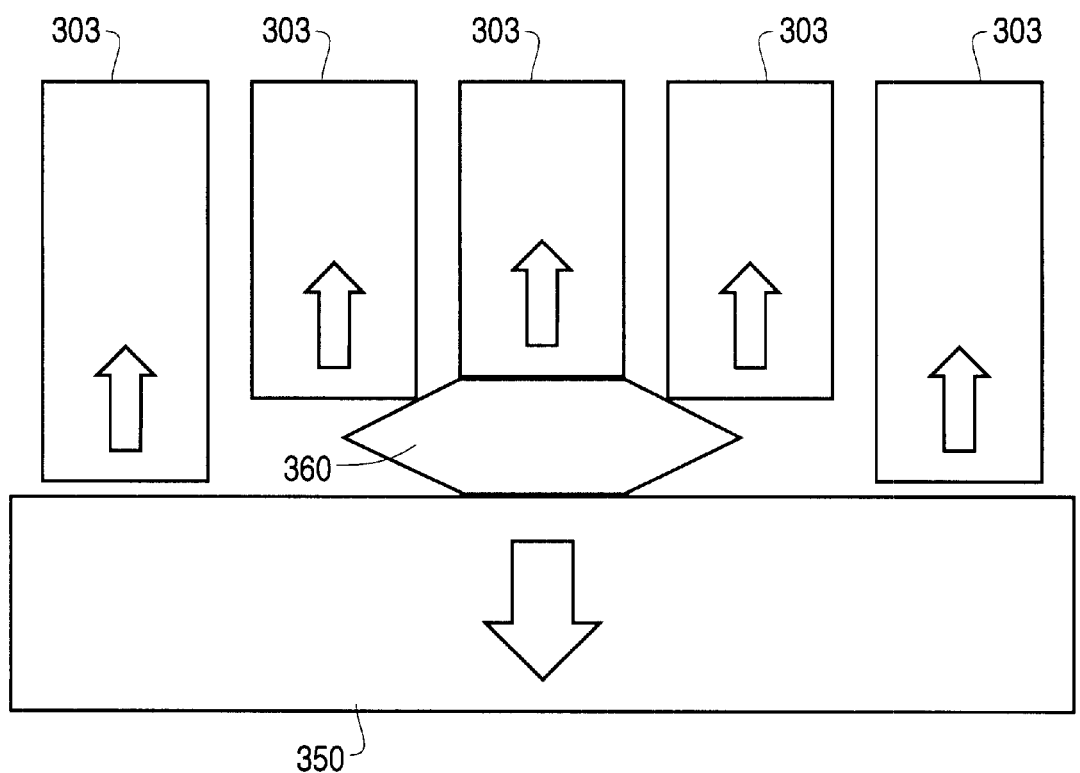
FIG. 9 illustrates a frontal view of an object on the conveyor belt in contact with multiple feeder conveyor belts.

FIG. 9 illustrates an end view of an embodiment of the present invention with multiple feeder conveyor belts 303 mounted over a single lower conveyor belt 350. As illustrated the multiple feeder conveyor belts 303 contact different portions of the upper surface of object 360. This configuration allows force to be applied to multiple areas of object 360.

In the preferred embodiment the components of the pulley assembly and the drive pulley assembly are made of stainless steel. Other suitable materials which may be used include: aluminum, steel, and other metals, carbon fiber, kevlar and other composite materials, plastics, ceramics, rubber and other materials, as well as combinations of these various known materials.

In an embodiment, the feeder conveyor belts and lower conveyor belt are made of a urethane reinforced with a polyester cord. Other suitable conveyor belt materials include: rubbers, plastics and other flexible materials. Alternative reinforcement materials for the conveyor belt may be metal or fibrous materials including: polyester, nylon, aramid, carbon or any other suitable material.

In another alternative embodiment, the feeder conveyor belt system applies force to objects on a lower surface which is not a conveyor belt. The objects are transported by a force which may include: feeder conveyor belts, rotating cylinders, mechanical or magnetic or any other suitable force. The lower surface is preferably planar and low friction. The low friction characteristic may be due to: air bearings, rotating cylinders, or any other suitable surface. The inventive feeder conveyor belt system applies force to the upper surface of objects regardless of what the lower surface is supported by. In the foregoing, a feeder conveyor belt system has been described. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. A feeder conveyor belt apparatus comprising:
   a plurality of stationary pulleys, each of which is connected to a stationary frame;
   a plurality of suspension pulleys, each of which is connected to a subframe;
   a plurality of linkage arms, each of which is rotatably connected to both the stationary frame and the subframe; and
   a conveyor belt which rotates around the plurality of stationary pulleys and the plurality of suspension pulleys.

2. The apparatus of claim 1 wherein:
   at least one of the plurality of stationary pulleys is a drive pulley which drives the conveyor belt around the stationary pulleys and the suspension pulleys.

3. The apparatus of claim 2 wherein:

the drive pulley is releasably attached to stationary frame with a releasable fastener.

4. The apparatus of claim 3 wherein:

the releasable fastener comprises: a buckle, a clamp or a screw.

5. The apparatus of claim 1 further comprising:

a planar surface under the feeder conveyor belt.

6. The apparatus of claim 5 wherein:

the planar surface is a second conveyor belt.

7. The apparatus of claim 5 wherein:

the planar surface is a substantially smooth flat surface across which objects slide.

8. The apparatus of claim 1 wherein:

the conveyor belt rotates around more than approximately 120 degrees of one of the plurality of suspension pulleys.

9. The apparatus of claim 1 wherein:

the plurality of linkage arms are substantially the same length.

10. The apparatus of claim 1 wherein:

a downward force is applied to the subframe.

11. A conveyor belt system comprising:

a substantially planar surface; and a plurality of feeder conveyor belts each comprising:
 a plurality of stationary pulleys, each mounted on a stationary frame;
 a plurality of suspension pulleys, each mounted on a subframe;
 a plurality of linkage arms, each of which is rotatably connected to both the stationary frame and the subframe; and
 a feeder conveyor belt which rotates around the plurality of stationary pulleys and the plurality of suspension pulleys;

wherein the plurality of feeder conveyor belts are mounted above the substantially planar surface.

12. The conveyor belt system of claim 11 wherein the feeder conveyor belts are configured substantially adjacent and parallel to each other.

13. The conveyor belt system of claim 11 wherein:

the planar surface is a lower conveyor belt.

14. The conveyor belt system of claim 11 wherein:

the linkage arms are substantially the same length.

15. The conveyor belt system of claim 11 wherein:

an downward force is applied to at least one of the subframes of the plurality of feeder conveyor belts.

16. A method of transporting an object comprising the steps of:

providing an object;

providing a planar surface;

providing a feeder conveyor belt system comprising:
 a plurality of stationary pulleys, each mounted on a stationary frame;
 a plurality of suspension pulleys, each mounted on a subframe;
 a plurality of linkage arms, each of which are rotatably connected to both the stationary frame and the subframe; and
 a feeder conveyor belt which rotates around the plurality of stationary pulleys and the plurality of suspension pulleys;

moving the object into contact with the feeder conveyor belt apparatus.

17. The method of claim 16 wherein:

the planar surface is a lower conveyor belt.

18. The method of claim 16 further comprising:

transmitting force from the feeder conveyor belt to the object.

19. The method of claim 16 further comprising:

rotating the linkage arms of the feeder conveyor belt apparatus such that the position of second frame and the conveyor belt adjusts to the contour of the surface of the object.

20. The method of claim 16 further comprising:

cutting the object with a slicing apparatus.

* * * * *